(12) United States Patent
Zhou et al.

(10) Patent No.: US 12,539,558 B2
(45) Date of Patent: Feb. 3, 2026

(54) LASER HEAD CONFIGURATIONS AND TECHNIQUES FOR MATERIALS PROCESSING

(71) Applicant: WBC Photonics, Inc., Wilmington, MA (US)

(72) Inventors: Wang-Long Zhou, Andover, MA (US); Francisco Villarreal-Saucedo, Middleton, MA (US); Bryan Lochman, Nashville, TN (US); Bien Chann, Merrimack, NH (US)

(73) Assignee: WBC Photonics, Inc., Wilmington, MA (US)

( * ) Notice: Subject to any disclaimer, the term of this patent is extended or adjusted under 35 U.S.C. 154(b) by 1131 days.

(21) Appl. No.: 17/123,305

(22) Filed: Dec. 16, 2020

(65) Prior Publication Data
US 2021/0197311 A1   Jul. 1, 2021

Related U.S. Application Data

(60) Provisional application No. 62/954,033, filed on Dec. 27, 2019.

(51) Int. Cl.
*B23K 26/035* (2014.01)
*B23K 26/073* (2006.01)
*B23K 26/21* (2014.01)
*H01S 5/183* (2006.01)

(52) U.S. Cl.
CPC .......... *B23K 26/035* (2015.10); *B23K 26/073* (2013.01); *B23K 26/21* (2015.10); *H01S 5/183* (2013.01)

(58) Field of Classification Search
CPC ...... B23K 26/035; B23K 26/04; B23K 26/06; B23K 26/062; B23K 26/073; B23K 26/08; B23K 26/21; B23K 26/36; B23K 26/38; B23K 37/02; G02B 27/10; G02B 27/14; H01S 5/183
See application file for complete search history.

(56) References Cited

U.S. PATENT DOCUMENTS

| | | | |
|---|---|---|---|
| 6,545,249 B2 | 4/2003 | Heyerick et al. | |
| 9,399,267 B2 | 7/2016 | Chen et al. | |
| 9,746,679 B2 | 8/2017 | Deutsch et al. | |
| 2002/0017512 A1* | 2/2002 | Heyerick | B23K 26/06 219/121.75 |
| 2003/0132209 A1 | 7/2003 | Kawaguchi et al. | |
| 2016/0079724 A1* | 3/2016 | Reeves-Hall | H01S 3/0675 372/6 |

FOREIGN PATENT DOCUMENTS

| | | | |
|---|---|---|---|
| CN | 203509348 | | 4/2014 |
| CN | 203509348 U | * | 4/2014 |

OTHER PUBLICATIONS

International Search Report and Written Opinion for International Application No. PCT/US2020/065206, dated Apr. 9, 2021, 16 pages.

* cited by examiner

*Primary Examiner* — Edward F Landrum
*Assistant Examiner* — Theodore J Evangelista
(74) *Attorney, Agent, or Firm* — Danielson Legal LLC

(57) ABSTRACT

In various embodiments, a laser head receives a laser output beam from a laser system or resonator without the use of a delivery optical fiber, and any asymmetry of the laser output beam may be maintained. The laser head may be physically rotatable to control orientation of the laser beam along a processing path on a workpiece.

23 Claims, 8 Drawing Sheets

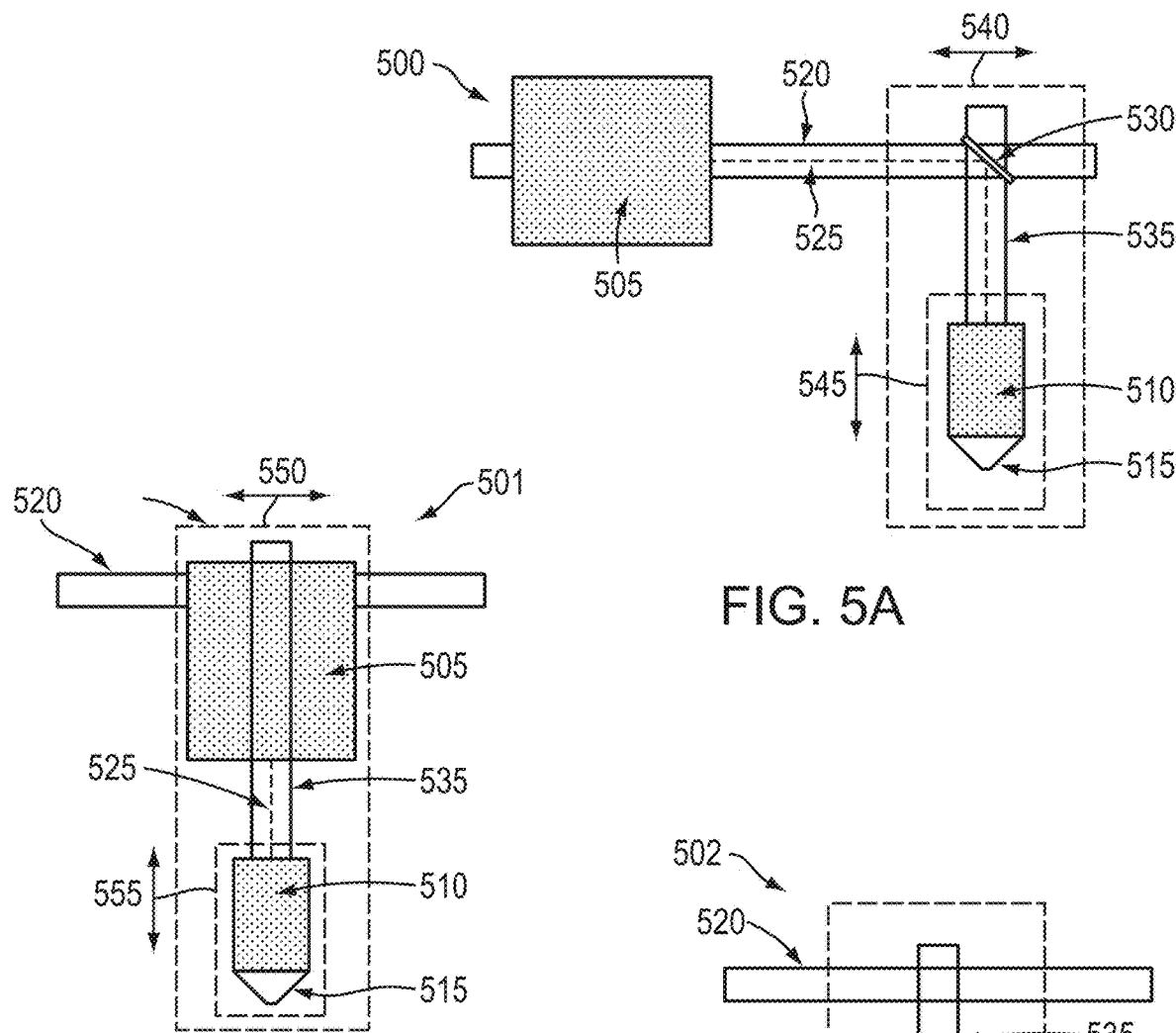
FIG. 5A
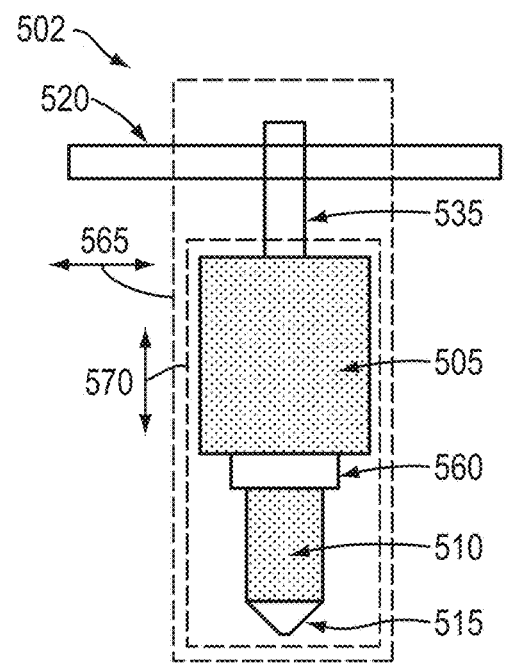
FIG. 5B
FIG. 5C

LASER HEAD CONFIGURATIONS AND TECHNIQUES FOR MATERIALS PROCESSING

RELATED APPLICATIONS

This application claims the benefit of and priority to U.S. Provisional Patent Application No. 62/954,033, filed Dec. 27, 2019, the entire disclosure of which is hereby incorporated herein by reference.

TECHNICAL FIELD

In various embodiments, the present invention relates to laser head configurations for laser delivery systems than may be utilized for processing (e.g., welding or cutting) of materials.

BACKGROUND

High-power lasers are used in many cutting, etching, annealing, welding, drilling, and soldering applications. As in any materials-processing operations, efficiency can be a critical limiting factor in terms of expense and time; the lower the efficiency, the higher will be the cost and/or the slower will be the operation of the laser deployed to process a given material. The properties of the laser beam can influence efficiency, and different materials (such as copper, aluminum, steel, and so forth) respond differently to beam properties as they are processed. Moreover, the thicknesses of these materials can affect their response. That is, the nature of a cut or weld may vary with the beam properties depending on the material and its thickness.

In addition, even for the same material and thickness thereof, the optical response (and thus optimal beam) of the material may vary depending upon the geometry of the processing. For example, the optical response of a material during a long straight cut may be different compared to an intricate shape with, e.g., sharp corners or other features.

Furthermore, high-power laser systems often include a laser emitter, the laser light from which is coupled into an optical fiber (a "delivery fiber," or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). (BPP values disclosed herein are in units of mm-mrad unless otherwise indicated.) A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

Wavelength beam combining (WBC) is a technique for scaling the output power and brightness from laser diodes, laser diode bars, stacks of diode bars, or other lasers arranged in a one- or two-dimensional array. WBC methods have been developed to combine beams along one or both dimensions of an array of emitters. Typical WBC systems include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein.

Typical laser-processing systems utilize optical delivery fibers to produce highly symmetric output beams that may be utilized for various processes and on various materials; even asymmetric beams coupled into optical delivery fibers are generally homogenized within the fiber by the time they exit the fiber and are utilized for processing. However, such beams may not be ideal for all processes, all workpieces, and all processing conditions. Moreover, optical fibers (and related hardware) tend to be expensive and are highly prone to failure when compared with other system components. Therefore, there is a need for laser systems that do not utilize beam-homogenizing optical delivery fibers and that are capable of delivering asymmetric beams to workpieces for processing.

SUMMARY

Typically, laser focal spots are designed to be symmetric in shape and beam quality for materials processing, since the processing direction may change arbitrarily during processing. In conventional systems, this is accomplished, at least in part, via the delivery fiber itself, which homogenizes the beam shape and beam quality along its length, even when the input beam is highly asymmetric. For example, high-power WBC laser systems can combine tens or even hundreds of multimode diode emitters yet produce output beams that are equivalent, in beam shape and beam quality, to those of a single diode emitter. Such beams are therefore typically highly asymmetric. For example, for a typical emitter size of 100 μm×1 μm, the difference in beam quality along the two perpendicular axes may be a factor of 10. Moreover, because diode bars are becoming available at increasingly high powers, WBC laser systems may be quite compact. For example, a WBC laser module emitting at approximately 1-2 kW at a 975 nm band may combine fewer than a dozen diode bars and have overall module dimensions comparable to those of a conventional laser cutting head.

In accordance with embodiments of the present invention, laser systems maintain the asymmetric properties of input laser beams (e.g., WBC laser beams) by introducing the beams from the laser source (or "resonator") into a laser head for processing without utilizing a delivery fiber therebetween. For example, in various embodiments of the invention, one or more output beams from the laser resonator propagate through free space to a laser head spaced away from the resonator, or the laser head itself is directly coupled to the resonator output. (In embodiments in which the output beam propagates in free space, it may be, but is not necessarily, fully exposed to the surrounding environment; rather, the free-space output beam may propagate within a larger shield, or sleeve, that does not itself confine the beam via internal reflection.) Various embodiments of the invention therefore reduce the overall risk of system failure by eliminating the delivery fiber, i.e., a component quite (or even most) prone to be damaged in laser systems. Moreover, embodiments of the invention are much less expensive, because fiber cables, together with industry-standard connectors and fiber-coupling units, tend to occupy a significant portion of the total cost of a laser system, particularly those having emission powers under a few kilowatts. Moreover, various embodiments of the invention utilize WBC systems or modules to form the resonator beam, and the compactness of such systems advantageously provides various options for direct integration with a laser-processing head.

Since embodiments of the invention transmit a laser beam directly from a laser resonator to a laser head without use of a delivery fiber therebetween, various embodiments of the invention lack any optical fibers therewithin. However, in accordance with other embodiments, optical fibers may be present in other portions of the system, as long as they are not utilized to carry the laser beam between the resonator and the laser head. For example, laser sources usable in various embodiments may include, consist essentially of, or consist of fiber lasers (based on optical fibers doped with optically active dopants) utilized to form the source beams within the resonator itself.

Embodiments of the invention therefore may deliver asymmetric output beams for materials processing. (As utilized herein, an "asymmetric" beam exhibits one or more beam characteristics (e.g., beam quality and/or size) that are different along different (e.g., perpendicular) axes by at least a factor of two, a factor of five, or a factor of ten; similarly, "symmetric" beams exhibit one or more beam characteristics that are substantially equal along different axes, e.g., differing by less than a factor of two, less than 50%, less than 25%, or less than 10%.) Such asymmetric beams may be rotated within the laser head to maintain a desired beam orientation relative to the processing direction and/or changes in one or more workpiece characteristics. Asymmetric output beams in accordance with embodiments of the invention may therefore be utilized for more efficient and effective processing than conventional symmetric beams resulting from the use of optical delivery fibers.

In other embodiments, the asymmetric beam from the beam source may be constantly rotated within the laser head to effectively obtain a symmetric, "homogenized" processing beam without the use of a costly, failure-prone delivery fiber. While an optical fiber required to homogenize a laser beam may only need to be a few hundred millimeters in length, coupling of a high-power laser beam (e.g., a few kW of power) into such a fiber will also require fiber endcaps, efficient cooling at both ends, high-quality coupling optics, precise adjustment mechanisms, and reliable mounting hardware, among other considerations. In addition, beam quality will typically always be degraded after passing through an optical fiber. For example, a typical WBC module with multiple diode bars at 975 nm will generate a laser beam having a BPP of about 3.5 mm-mrad and 1 mm-mrad on the slow axis (non-WBC dimension) and fast axis (WBC dimension), respectively. A fiber of 100 μm core size will be typically required for fiber coupling of such a laser, and after being output from such a fiber, the laser beam will typically exhibit a BPP that has been degraded to 4 mm-mrad in all directions. Thus, embodiments of the invention may be utilized to form laser beams that are homogenized in shape and BPP, at least as experienced by a workpiece being processed, while avoiding the issues and beam degradation concomitant with the use of optical delivery fibers.

While laser heads featuring physically rotatable beam rotators are primarily depicted and described herein as being utilized in laser systems in which a laser beam does not propagate between a laser resonator (or system or source) and the laser head within an optical fibers, such laser heads may also be utilized in systems using delivery fibers therewithin.

Embodiments of the present invention are typically utilized to process a workpiece such that the surface of the workpiece is physically altered and/or such that a feature is formed on or within the surface, in contrast with optical techniques that merely probe a surface with light (e.g., reflectivity measurements). Exemplary processes in accordance with embodiments of the invention include cutting, welding, drilling, and soldering. Various embodiments of the invention also process workpieces at one or more spots or along a one-dimensional processing path, rather than flooding all or substantially all of the workpiece surface with radiation from the laser beam. In general, processing paths may be curvilinear or linear, and "linear" processing paths may feature one or more directional changes, i.e., linear processing paths may be composed of two or more substantially straight segments that are not necessarily parallel to each other.

Herein, "optical elements" may refer to any of lenses, mirrors, prisms, gratings, and the like, which redirect, reflect, bend, or in any other manner optically manipulate electromagnetic radiation, unless otherwise indicated. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The laser beams utilized in the embodiments herein may be single-wavelength or multi-wavelength beams combined using various techniques known in the art. In addition, references to "lasers," "laser emitters," or "beam emitters" herein include not only single-diode lasers, but also diode bars, laser arrays, diode bar arrays, and single or arrays of vertical cavity surface-emitting lasers (VCSELs). Herein, it is understood that references to different "wavelengths" encompass different "ranges of wavelengths," and the wavelength (or color) of a laser corresponds to the primary wavelength thereof; that is, emitters may emit light having a finite band of wavelengths that includes (and may be centered on) the primary wavelength.

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as processing beams in embodiments of the present invention for, e.g., piercing and/or cutting of a workpiece.

Resonators in accordance with embodiments of the present invention may feature two separate cooling loops that may each operate at a different temperature, such as those detailed in U.S. patent application Ser. No. 17/104,481, filed on Nov. 25, 2020 ("the '481 application"), the entire disclosure of which is incorporated by reference herein. For example, as detailed in the '481 application, a lower-temperature cooling loop may be utilized to cool beam emitters within the resonator while a higher-temperature cooling loop is utilized to cool other optical components within and/or external to the resonator (e.g., optical elements such as lenses, dispersive elements, etc., and/or the processing head, or a portion thereof, itself). In such embodiments, the higher-temperature cooling loop and the lower-temperature cooling loop may be "fluidly isolated" from each other, i.e., may not comingle cooling fluid and may not include conduits that are fluidly connected to each other, at least within the resonator module itself. Outside of the resonator module, the cooling loops may share one or more components and/or conduits, e.g., a larger source of cooling fluid that may be cooled to different temperatures in each of the cooling loops. Such configurations may advantageously reduce or minimize condensation within the laser system. However, resonators in accordance with embodiments of the invention may also utilize only a single cooling loop within the resonator and/or multiple cooling loops operated at approximately the same temperature.

In various embodiments featuring multiple cooling loops, the lower-temperature cooling loop may supply a cooling fluid, for cooling the beam emitters, at a temperature ranging from, for example, approximately −25° C. to approximately 25° C., or ranging from approximately 5° C. to approximately 10° C. In various embodiments, the higher-temperature cooling loop may supply a cooling fluid (which may be the same as or different from the cooling fluid supplied by the lower-temperature cooling loop) at a temperature ranging from, for example, approximately 20° C. to approximately 50° C., or ranging from approximately 35° C. to approximately 50° C. In various embodiments, the temperature of the cooling fluid supplied by the lower-temperature cooling loop may have a temperature that is less than the temperature of the cooling fluid supplied by the higher-temperature cooling fluid by at least approximately 10° C., at least approximately 15° C., at least approximately 20° C., at least approximately 25° C., at least approximately 30° C., at least approximately 35° C., at least approximately 40° C., at least approximately 45° C., or at least approximately 50° C.

As known to those of skill in the art, lasers are generally defined as devices that generate visible or invisible light through stimulated emission of light. Lasers generally have properties that make them useful in a variety of applications, as mentioned above. Common laser types include semiconductor lasers (e.g., laser diodes and diode bars), solid-state lasers, fiber lasers, and gas lasers. A laser diode is generally based on a simple diode structure that supports the emission of photons (light). However, to improve efficiency, power, beam quality, brightness, tunability, and the like, this simple structure is generally modified to provide a variety of many practical types of laser diodes. Laser diode types include small edge-emitting varieties that generate from a few milliwatts up to roughly half a watt of output power in a beam with high beam quality. Structural types of diode lasers include double hetero-structure lasers that feature a layer of low bandgap material sandwiched between two high bandgap layers; quantum well lasers that include a very thin middle (quantum well) layer resulting in high efficiency and quantization of the laser's energy; multiple quantum well lasers that include more than one quantum well layer to improve gain characteristics; quantum wire or quantum sea (dots) lasers that replace the middle layer with a wire or dots to produce higher-efficiency quantum well lasers; quantum cascade lasers that enable laser action at relatively long wavelengths that may be tuned by altering the thickness of the quantum layer; separate confinement heterostructure lasers, which are the most common commercial laser diode and include another two layers above and below the quantum well layer to efficiently confine the light produced; distributed feedback lasers, which are commonly used in demanding optical communication applications and include an integrated diffraction grating that facilitates generating a stable wavelength set during manufacturing by reflecting a single wavelength back to the gain region; vertical-cavity surface-emitting lasers (VCSELs), which have a different structure that other laser diodes in that light is emitted from its surface rather than from its edge; and vertical-external-cavity surface-emitting lasers (VECSELs) and external-cavity diode lasers, which are tunable lasers that use mainly double heterostructure diodes and include gratings or multiple-prism grating configurations. External-cavity diode lasers are often wavelength-tunable and exhibit a small emission line width. Laser diode types also include a variety of high power diode-based lasers including: broad area lasers that are characterized by multi-mode diodes with oblong output facets and generally have poor beam quality but generate a few watts of power; tapered lasers that are characterized by astigmatic mode diodes with tapered output facets that exhibit improved beam quality and brightness when compared to broad area lasers; ridge waveguide lasers that are characterized by elliptical mode diodes with oval output facets; and slab-coupled optical waveguide lasers (SCOWL) that are characterized by circular mode diodes with output facets and may generate watt-level output in a diffraction-limited beam with nearly a circular profile.

A diode-laser bar is a type of semiconductor laser containing a one-dimensional array of broad-area emitters or alternatively containing sub arrays containing, e.g., 10-20 narrow stripe emitters. A broad-area diode bar typically contains, for example, 19-49 emitters, each having dimensions on the order of, e.g., 1 $\mu m \times 100$ $\mu m$. The beam quality along the 1 $\mu m$ dimension or fast-axis is typically diffraction-limited. The beam quality along the 100 $\mu m$ dimension or slow-axis or array dimension is typically many times diffraction-limited. Typically, a diode bar for commercial applications has a laser resonator length of the order of 1 to 4 mm, is about 10 mm wide and generates tens of watts of output power. Most diode bars operate in the wavelength region from 780 to 1070 nm, with the wavelengths of 808 nm (for pumping neodymium lasers) and 940 nm (for pumping Yb:YAG) being most prominent. The wavelength range of 915-976 nm is used for pumping erbium-doped or ytterbium-doped high-power fiber lasers and amplifiers.

Various embodiments of the invention may be utilized with laser systems featuring techniques for varying BPP of their output laser beams, such as those described in U.S. patent application Ser. No. 14/632,283, filed on Feb. 26, 2015, and U.S. patent application Ser. No. 15/188,076, filed on Jun. 21, 2016, the entire disclosure of each of which is incorporated herein by reference.

In an aspect, embodiments of the invention feature a laser system for directing a laser beam to a workpiece to be processed. The laser system includes, consists essentially of, or consists of a laser resonator and a laser head. The laser resonator includes, consists essentially of, or consists of (i)

a resonator housing, (ii) a plurality of beam emitters, each configured to emit one or more beams, disposed within the resonator housing, (iii) disposed within the resonator housing, a plurality of optical components for manipulating the beams from the beam emitters to form an output beam, and (iv) a resonator output for transmitting the output beam from the resonator housing. The laser head is positioned to receive the output beam from the laser resonator. The laser head includes, consists essentially of, or consists of (i) a beam rotator configured to (a) receive the output beam and optically rotate the output beam by a rotation angle, and (b) be physically rotatable about an axis parallel to a propagation direction of the output beam, and (ii) focusing optics for focusing the output beam toward the workpiece.

Embodiments of the invention may include one or more of the following in any of a variety of combinations. The output beam may not propagate within an optical fiber between the laser resonator and the laser head. The laser head may be mechanically coupled to, and/or in direct mechanical contact with, the laser resonator. The laser head may be directly coupled to the laser resonator with an adaptor therebetween. The laser head may be spaced away from the laser resonator, and the output beam may propagate in free space therebetween. The laser system may include a first rail to which the laser head is mechanically coupled. The laser head may be configured for vertical translation along the first rail over the workpiece. The laser resonator may be mechanically coupled to the first rail. The laser resonator may be configured for vertical translation along the first rail during vertical translation of the laser head along the first rail. The laser resonator may be configured to remain stationary on the first rail during vertical translation of the laser head along the first rail. The laser system may include a second rail, angled with respect to (e.g., perpendicular to) the first rail. The laser head may be configured for horizontal translation over the workpiece via the second rail. The laser resonator may be mechanically coupled to the second rail. The laser resonator may be configured to remain stationary on the second rail during translation of the laser head via the second rail. The laser system may include a reflector for receiving the output beam from the laser resonator and redirecting the output beam to the laser head. The output beam may be asymmetric in beam quality and/or beam shape. The output beam may be a multi-wavelength beam.

The laser resonator may include, disposed within the resonator housing, a resonator baseplate having opposing first and second sides and defining an opening therethrough extending from the first to the second side. The plurality of beam emitters may be disposed on or over the first side of the resonator baseplate. At least some of the optical components may be disposed on or over the second side of the resonator baseplate. At least some of the optical components may be disposed on or over the first side of the resonator baseplate. The plurality of optical components may include, disposed on or over the second side of the resonator baseplate, (i) a dispersive element for combining the beams emitted by the beam emitters into a multi-wavelength beam, and (ii) a partially reflective output coupler for receiving the multi-wavelength beam from the dispersive element, transmitting a first portion of the multi-wavelength beam as the output beam, and reflecting a second portion of the multi-wavelength beam back toward the dispersive element (and thence to the beam emitters to stabilize emission thereof). The plurality of optical components may include, disposed on or over the first side of the resonator baseplate, (i) a plurality of slow-axis collimation lenses disposed optically downstream of the plurality of beam emitters, each slow-axis collimation lens being configured to receive one or more beams from one of the beam emitters, and (ii) a plurality of folding mirrors disposed optically downstream of the slow-axis collimation lenses and positioned to receive beams therefrom and reflect the beams through the opening. The resonator output may be spaced away from the partially reflective output coupler and positioned to receive the output beam therefrom. The resonator output may include or may be the partially reflective output coupler. The laser head may be directly coupled to the beam output. The laser system may include an adaptor mechanically coupling the laser head to the laser resonator at the beam output. The laser head may be spaced away from the beam output, and the output beam may propagate through free space therebetween.

In another aspect, embodiments of the invention feature a laser system for directing a laser beam to a workpiece to be processed. The laser system includes, consists essentially of, or consists of a laser resonator configured to emit an output beam, a laser head positioned to receive the output beam from the laser resonator, and a controller (e.g., a computer-based controller). The laser head includes, consists essentially of, or consists of (i) a beam rotator configured to (a) receive the output beam and optically rotate the output beam by a rotation angle, and (b) be physically rotatable about an axis parallel to a propagation direction of the output beam, and (ii) focusing optics for focusing the output beam toward the workpiece. The controller is configured to control physical rotation of the beam rotator, and the beam rotator is responsive to the controller.

Embodiments of the invention may include one or more of the following in any of a variety of combinations. The controller may be configured to physically rotate the beam rotator to maintain a consistent orientation of the output beam along a processing path on the workpiece. The output beam may be asymmetric in beam quality and/or shape along first and second axes. The controller may be configured to maintain the first axis of the output beam substantially parallel to (or at another fixed non-zero angle with respect to) the processing path. The first axis may be longer than the second axis. The first axis may be shorter than the second axis. The controller may be configured to constantly physically rotate the beam rotator as the output beam is translated along a processing path on the workpiece. The output beam may be asymmetric in beam shape. Constant rotation of the beam rotator may form a circular or symmetric laser spot on the workpiece. The focusing optics may be optically downstream of the beam rotator. The focusing optics may be optically upstream of the beam rotator. The laser head may include a beam expander for increasing a size of the output beam. The laser head may include a beam contractor for decreasing a size of the output beam. The beam expander or beam contractor may be optically downstream of the beam rotator. The beam expander or beam contractor may be optically upstream of the beam rotator. The beam expander or beam contractor may include, consist essentially of, or consist of first and second lenses. The beam rotator may be disposed optically downstream of the first lens and optically upstream of the second lens. The rotation angle may be approximately 90°. The beam rotator may include, consist essentially of, or consist of two lenses. The two lenses may be parallel, confocal, and/or cylindrical. The two lenses may be portions of a single monolithic optical element. The two lenses may be separate, spaced-apart components. The beam rotator may include, consist essentially of, or consist of a Dove prism. The laser head or laser system may include a wave plate for altering a polarization of the output beam. The output beam may not propagate within an optical fiber between the laser resonator and the laser head.

In yet another aspect, embodiments of the invention feature a laser head for use with a laser resonator configured to emit an output beam. The laser head receives the output beam and directs the output beam to a workpiece to be processed. The laser head includes, consists essentially of, or consists of a beam rotator configured to receive the output beam and optically rotate the output beam by a rotation angle, and focusing optics for focusing the output beam toward the workpiece. The beam rotator is configured to be physically rotatable about an axis parallel to a propagation direction of the output beam.

Embodiments of the invention may include one or more of the following in any of a variety of combinations. The focusing optics may be optically downstream of the beam rotator. The focusing optics may be optically upstream of the beam rotator. The laser head may include a beam expander for increasing a size of the output beam. The laser head may include a beam contractor for decreasing a size of the output beam. The beam expander or beam contractor may be optically downstream of the beam rotator. The beam expander or beam contractor may be optically upstream of the beam rotator. The beam expander or beam contractor may include, consist essentially of, or consist of first and second lenses. The beam rotator may be disposed optically downstream of the first lens and optically upstream of the second lens.

The laser head may include or be coupled to a controller for controlling physical rotation of the beam rotator, the beam rotator being responsive to the controller. The controller may be configured to physically rotate the beam rotator to maintain a consistent orientation of the output beam along a processing path on the workpiece. The output beam may be asymmetric in beam quality and/or shape along first and second axes. The controller may be configured to maintain the first axis of the output beam substantially parallel to (or at another fixed non-zero angle with respect to) the processing path. The first axis may be longer than the second axis. The first axis may be shorter than the second axis. The controller may be configured to constantly physically rotate the beam rotator as the output beam is translated along a processing path on the workpiece. The output beam may be asymmetric in beam shape. Constant rotation of the beam rotator may form a circular or symmetric laser spot on the workpiece. The laser head may not contain or include any optical fiber. The laser head may not be configured for connection to an optical fiber. The laser head may be configured to receive a free-space output beam.

The rotation angle may be approximately 90°. The beam rotator may include, consist essentially of, or consist of two lenses. The two lenses may be parallel, confocal, and/or cylindrical. The two lenses may be portions of a single monolithic optical element. The two lenses may be separate, spaced-apart components. The beam rotator may include, consist essentially of, or consist of a Dove prism. The laser head may include a wave plate for altering a polarization of the output beam.

In another aspect, embodiments of the invention feature a laser system for directing a laser beam to a workpiece to be processed. The laser system includes, consists essentially of, or consists of a laser resonator configured to emit an output beam, and a laser head positioned to receive the output beam from the laser resonator and direct the output beam toward a workpiece for processing thereof. The output beam does not propagate within an optical fiber between the laser resonator and the laser head.

Embodiments of the invention may include one or more of the following in any of a variety of combinations. The laser head may be mechanically coupled to, and/or in direct mechanical contact with, the laser resonator. The laser head may be directly coupled to the laser resonator with an adaptor therebetween. The laser head may be spaced away from the laser resonator, and the output beam may propagate in free space therebetween. The laser system may include a first rail to which the laser head is mechanically coupled. The laser head may be configured for vertical translation along the first rail over the workpiece. The laser resonator may be mechanically coupled to the first rail. The laser resonator may be configured for vertical translation along the first rail during vertical translation of the laser head along the first rail. The laser resonator may be configured to remain stationary on the first rail during vertical translation of the laser head along the first rail. The laser system may include a second rail, angled with respect to (e.g., perpendicular to) the first rail. The laser head may be configured for horizontal translation over the workpiece via the second rail. The laser resonator may be mechanically coupled to the second rail. The laser resonator may be configured to remain stationary on the second rail during translation of the laser head via the second rail. The laser system may include a reflector for receiving the output beam from the laser resonator and redirecting the output beam to the laser head. The output beam may be asymmetric in beam quality and/or beam shape. The output beam may be a multi-wavelength beam.

The laser resonator may include, consist essentially of, or consist of a resonator housing, a plurality of beam emitters, a plurality of optical components, and a resonator output for transmitting the output beam from the resonator housing. Each beam emitter may be configured to emit one or more beams. The beam emitters may be disposed within the resonator housing. The plurality of optical components may be disposed within the resonator housing. The optical components may manipulate (e.g., reflect, focus, redirect, wavelength-disperse, combine, etc.) the beams from the beam emitters to form the output beam. The laser resonator may include, disposed within the resonator housing, a resonator baseplate having opposing first and second sides and defining an opening therethrough extending from the first to the second side. The plurality of beam emitters may be disposed on or over the first side of the resonator baseplate. The plurality of optical components may include, consist essentially of, or consist of, disposed on or over the second side of the resonator baseplate, (i) a dispersive element for combining the beams emitted by the beam emitters into a multi-wavelength beam, and (ii) a partially reflective output coupler for receiving the multi-wavelength beam from the dispersive element, transmitting a first portion of the multi-wavelength beam as the output beam, and reflecting a second portion of the multi-wavelength beam back toward the dispersive element (and thence to the beam emitters to stabilize emission thereof). The plurality of optical components may include, disposed on or over the first side of the resonator baseplate, (i) a plurality of slow-axis collimation lenses disposed optically downstream of the plurality of beam emitters, each slow-axis collimation lens configured to receive one or more beams from one of the beam emitters, and (ii) a plurality of folding mirrors disposed optically downstream of the slow-axis collimation lenses and positioned to receive beams therefrom and reflect the beams through the opening. The resonator output may be spaced away from the partially reflective output coupler and positioned to receive the output beam therefrom. The resonator output may include or be the partially reflective output coupler.

The laser head may include a beam rotator and focusing optics for focusing the output beam toward the workpiece. The beam rotator may be configured to (i) receive the output beam and optically rotate the output beam by a rotation angle, and (ii) be physically rotatable about an axis parallel to a propagation direction of the output beam. The laser system may include a controller for controlling physical rotation of the beam rotator. The beam rotator may be responsive to the controller. The controller may be configured to physically rotate the beam rotator to maintain a consistent orientation of the output beam along a processing path on the workpiece. The output beam may be asymmetric in beam quality and/or shape along first and second axes. The controller may be configured to maintain the first axis of the output beam substantially parallel to (or at another fixed non-zero angle with respect to) the processing path. The first axis may be longer than the second axis. The first axis may be shorter than the second axis. The controller may be configured to constantly physically rotate the beam rotator as the output beam is translated along a processing path on the workpiece. The output beam may be asymmetric in beam shape. Constant rotation of the beam rotator may form a circular or symmetric laser spot on the workpiece.

In yet another aspect, embodiments of the invention feature a method of processing a workpiece with a laser beam. An output beam is emitted from a laser resonator. The output beam is received from the laser resonator with or at a laser head. The output beam does not propagate within an optical fiber between the laser resonator and the laser head. The output beam is directed, with or via the laser head, toward the workpiece for processing thereof.

Embodiments of the invention may include one or more of the following in any of a variety of combinations. Processing the workpiece may include, consist essentially of, or consist of physically altering at least a portion of a surface of the workpiece. Processing the workpiece may include, consist essentially of, or consist of etching, cutting, welding, and/or drilling. The output beam emitted from the laser resonator may be asymmetric in beam quality and/or shape along or with respect to first and second axes. The output beam may be rotated at the laser head to form a substantially circular or symmetric laser spot on the workpiece. The first axis of the output beam may be maintained, via beam rotation within the laser head, substantially parallel to a processing path extending across the workpiece. The first axis may be longer than the second axis. The first axis may be shorter than the second axis. The laser resonator may include, consist essentially of, or consist of a wavelength-beam-combining laser resonator. The output beam may include, consist essentially of, or consist of a multi-wavelength beam. The output beam may be propagated from the laser resonator to the laser head in free space. A polarization of the output beam may be adjusted within, upstream of, and/or downstream of the laser head.

The laser head may include, consist essentially of, or consist of a beam rotator and focusing optics for focusing the output beam toward the workpiece. The beam rotator may be configured to (i) receive the output beam and optically rotate the output beam by a rotation angle, and (ii) be physically rotatable about an axis parallel to a propagation direction of the output beam. The rotation angle may be approximately 90°. The laser head may be translated vertically over the workpiece during processing thereof. The laser resonator may be translated vertically during vertical translation of the laser head. The laser resonator may not be translated vertically during vertical translation of the laser head. The laser resonator may remain stationary during vertical translation of the laser head. The laser head may be translated horizontally over the workpiece during processing thereof. The laser resonator may be translated horizontally during horizontal translation of the laser head. The laser resonator may not be translated horizontally during horizontal translation of the laser head. The laser resonator may remain stationary during horizontal translation of the laser head. Emitting the output beam from the laser resonator may include, consist essentially of, or consist of (i) within the laser resonator, operating a plurality of beam emitters to emit beams therefrom, and (ii) manipulating the beams within the laser resonator to form the output beam. Manipulating the beams may include, consist essentially of, or consist of (i) combining the beams emitted by the plurality of beam emitters into a multi-wavelength beam, a first portion of the multi-wavelength beam being emitted as the output beam, and (ii) directing a second portion of the multi-wavelength beam back to the plurality of beam emitters to stabilize emission thereof.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other. Distances utilized herein may be considered to be "optical distances" unless otherwise specified.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 5A-5C are schematic diagrams of integrated laser systems in accordance with various embodiments of the present invention;

DETAILED DESCRIPTION

Figure 1A:
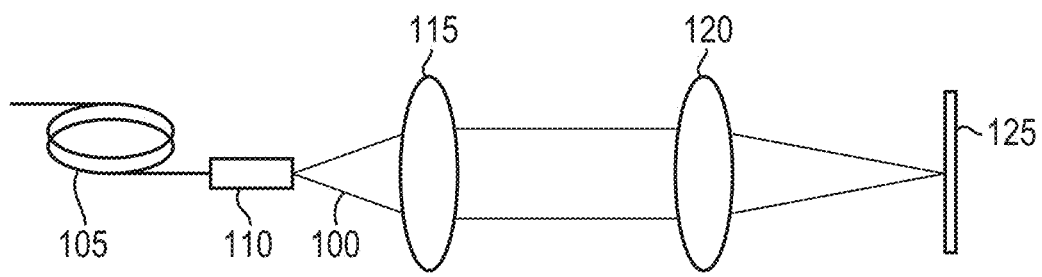
FIG. 1A is a schematic diagram of a conventional laser head with an optical-fiber input.
Figure 1B:
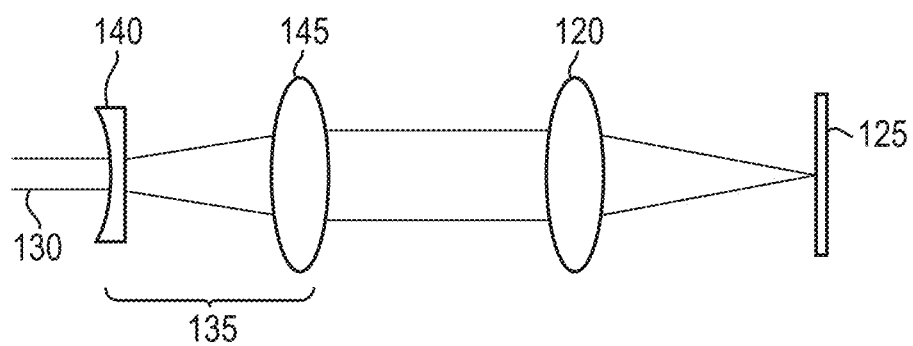
FIG. 1B is a schematic diagram of a conventional laser head with a free-space input.

FIGS. 1A and 1B depict conventional laser heads with optical-fiber or free-space inputs, respectively. FIG. 1A depicts a laser head receiving a laser beam 100 from an optical fiber (or "power delivery fiber") 105 having a fiber endcap 110. FIG. 1A depicts the primary optical components of the laser head, including a collimator 115 and focusing optics 120, which focuses the beam toward a workpiece 125. FIG. 1B also depicts primary optical components for a laser head accepting a free-space laser beam 130. In order to obtain a relatively small focal spot on workpiece 125, the laser head may include a beam expander 135, formed with lenses 140, 145. For example, lens 140 may be a negative, plano-concave lens, while lens 145 may be a positive, double-convex lens. In various embodiments, the lenses 140, 145 may be separated by a distance approximately equal to the sum of their focal lengths. Other possible optical components that may be included in the laser head include (not shown) input and output windows, beam splitters, wave plates, beam-steering mirrors, imaging and monitoring optics, etc.

Figure 2:
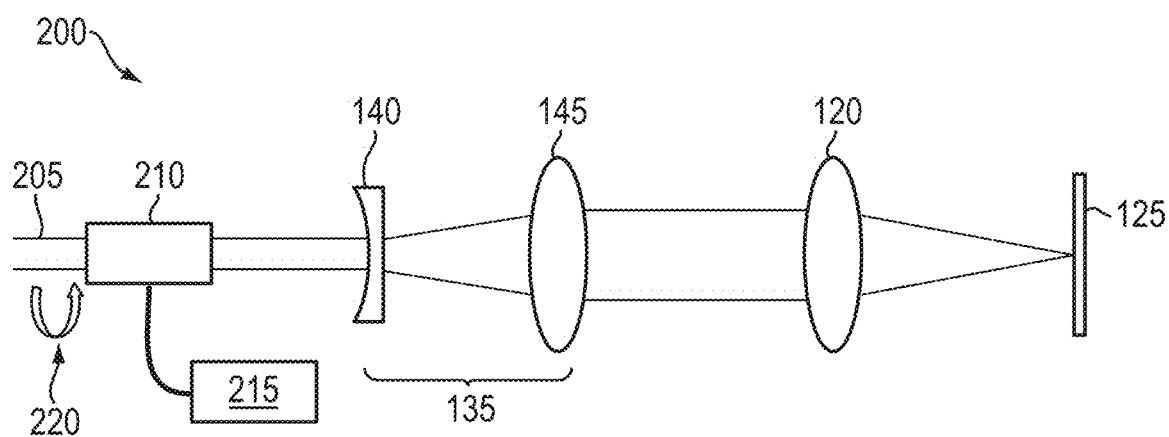
FIG. 2 is a schematic diagram of a laser head in accordance with various embodiments of the present invention.

FIG. 2 is a schematic diagram of a laser head 200 in accordance with various embodiments of the present invention. As shown, an input laser beam 205 is received by a beam rotator 210, which rotates the beam by a desired angle (typically 90°, but other angles are possible and are within embodiments of the present invention; see, e.g., FIGS. 3A and 3B). In various embodiments, the laser beam 205 is asymmetric in shape, beam quality, or both. The beam rotator 210 is responsive to (and may be coupled to, e.g., in wired or wireless fashion) a controller 215, which physically rotates the beam rotator itself along the propagation axis of the laser beam 205 (i.e., on a plane perpendicular to the beam propagation), as indicated by arrow 220. That is, within the laser head, the beam rotator 210 optically rotates the incoming beam 205, and the beam rotator 210 itself is physically rotatable to alter the orientation of the resulting output beam delivered to the workpiece 125. In various embodiments of the invention, the optical element(s) of the beam rotator 210 may be fixed rotationally, i.e., may not themselves be physically rotatable with respect to the beam rotator 210 itself (e.g., with respect to a housing in which the optical element(s) are disposed). In various embodiments, one or more wave plates (e.g., quarter-wave plates, half-wave plates, etc.) may be disposed upstream or downstream of the beam rotator 210 to alter or scramble (i.e., homogenize) the polarization of the beam; this may be desirable, particularly in embodiments in which the beam rotator 210 itself may alter the beam polarization (e.g., the Dove prism depicted in FIG. 3B).

In various embodiments, as shown in FIG. 2, the beam rotator 210 is disposed upstream of the beam expander 135 and the focusing optics 120, where the input beam is typically collimated and relatively small in size. However, in other embodiments, the beam rotator 210 may be placed within the beam expander 135 (e.g., downstream of lens 140 and upstream of lens 145), between the beam expander 135 and the focusing optics 120, or even downstream of the focusing optics 120. In addition, in various embodiments the beam expander 135 itself may be omitted, for example if the input beam 205 has a relative large beam size or a relatively large focal spot on workpiece 125 is needed or desired.

In various embodiments, the laser head contains one or more optical elements utilized to focus the beam onto workpiece 125 for processing thereof. For example, laser heads in accordance with embodiments of the invention may include one or more collimators (i.e., collimating lenses) and/or focusing optics (e.g., one or more focusing lenses such as focusing optics 120). A laser head may not include a collimator if, e.g., the beam entering the laser head is already collimated (e.g., by one or more optical elements upstream of the laser head). Laser heads in accordance with various embodiments may also include one or more protective window and/or a focus-adjustment mechanism (manual or automatic, e.g., one or more dials and/or switches and/or selection buttons). Laser heads may also include one or more monitoring systems for, e.g., laser power, target material temperature and/or reflectivity, plasma spectrum, etc.

In various embodiments, the controller 215 not only controls the physical rotation of beam rotator 210, but also may initiate processes performed using the laser head 200 and switch on/off (and/or modulate the output power level of) the input beam 205 accordingly. In various embodiments, the controller 215 may even control the motion of the laser head 200 relative to the workpiece 125 via control of, e.g., one or more actuators. The controller 215 may also operate a conventional positioning system configured to cause relative movement between the output laser beam and the workpiece 125 being processed. For example, the positioning system may be any controllable optical, mechanical or opto-mechanical system for directing the beam through a processing path along a two-dimensional (i.e., thin) or three-dimensional (e.g., having one or more surface features, protrusions, and/or depressions) workpiece. During processing, the controller 215 may operate the positioning system and the laser system so that the laser beam traverses a processing path along the workpiece. The processing path may be provided by a user and stored in an onboard or remote memory, which may also store parameters relating to the type of processing (cutting, welding, etc.) and the beam characteristics and/or orientations (e.g., orientations of beam quality and/or shape) necessary to carry out that processing along the processing path. In this regard, a local or remote database may maintain a library of materials and thicknesses that the system will process, and upon user selection of material parameters (type of material, thickness, etc.), the controller 215 queries the database to obtain the corresponding physical rotation (and/or rotation speed) to be utilized for beam rotator 210. The stored values may include beam orientations suitable for various processes of the material (e.g., piercing, cutting, etc.), the type of processing, and/or the geometry and/or direction of the processing path.

As is well understood in the plotting and scanning art, the requisite relative motion between the output beam and the workpiece may be produced by optical deflection of the beam using a movable mirror, physical movement of the laser using a gantry, lead-screw or other arrangement, and/or a mechanical arrangement for moving the workpiece rather than (or in addition to) the beam. The controller 215 may, in some embodiments, receive feedback regarding the position and/or processing efficacy of the beam relative to the workpiece from a feedback unit, which will be connected to suitable monitoring sensors.

Embodiments of the invention may enable a user to process (e.g., cut or weld) a workpiece along a desired processing path, and the orientation of the output beam, rotation angle and/or rotation speed of beam rotator 210, and/or maximum processing speed is selected based on factors such as, but not limited to, the composition of the workpiece, the thickness of the workpiece, the geometry of the processing path, etc. For example, a user may select or preprogram the desired processing path and/or type (and/or other properties such as thickness) of the workpiece into the system using any suitable input device or by means of file transfer. Thereafter, the controller 215 may determine optimum output beam orientation or level of asymmetry as a function of location along the processing path. In operation, the controller 215 may operate the laser system and positioning of the workpiece to process the workpiece along the preprogrammed path, utilizing the proper output beam orientation or asymmetry/symmetry for processes such as welding, cutting, etching, etc. If the composition and/or thickness of the material being processed changes and/or the processing direction changes, the location and nature of the change may be programmed, and the controller 215 may adjust the laser beam orientation or asymmetry/symmetry and/or the rate of relative motion between the workpiece and the beam accordingly.

In addition, the laser system may incorporate one or more systems for detecting the thickness of the workpiece and/or heights of features thereon. For example, the laser system may incorporate systems (or components thereof) for interferometric depth measurement of the workpiece, as detailed in U.S. patent application Ser. No. 14/676,070, filed on Apr. 1, 2015, the entire disclosure of which is incorporated by reference herein. Such depth or thickness information may be utilized by the controller to control the output beam composition to optimize the processing (e.g., cutting or piercing) of the workpiece, e.g., in accordance with records in the database corresponding to the type of material being processed.

The controller (or "control system") 215 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described herein. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C#, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Figure 3A:
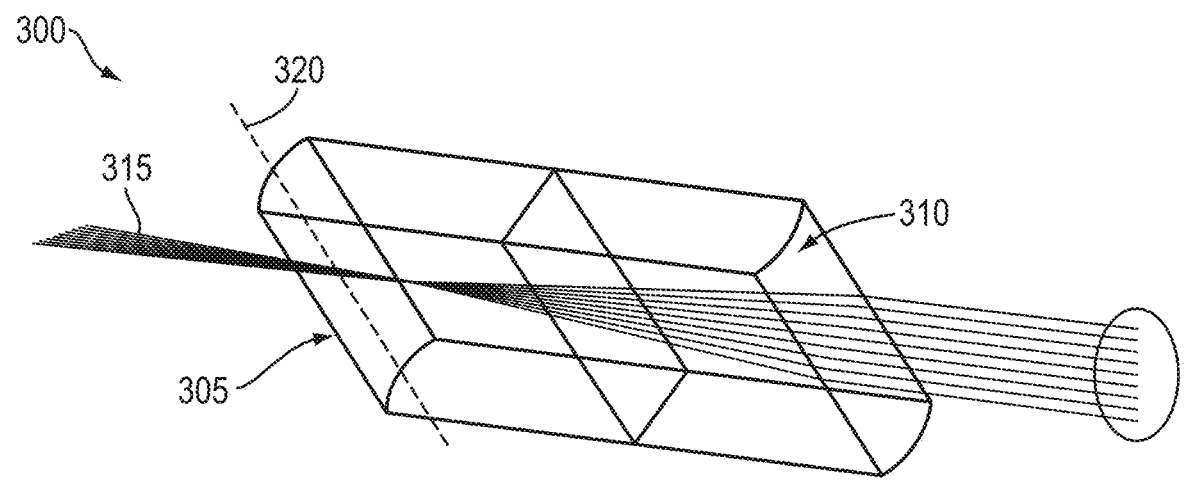
FIGS. 3A and 3B are schematic diagrams of beam rotators in accordance with various embodiments of the present invention.
Figure 3B:
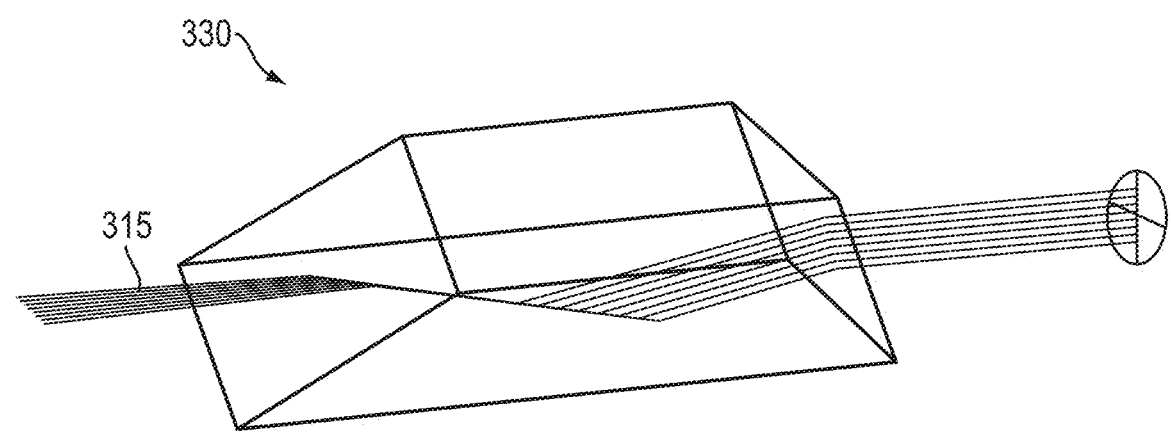

FIGS. 3A and 3B depict exemplary beam rotators that may be utilized in accordance with embodiments of the present invention. FIG. 3A shows a beam rotator 300 formed by two cylindrical lenses 305, 310 positioned in parallel and confocally. As shown in FIG. 3A, the beam rotator 300 rotates an incoming beam 315 by 90° when a rotator lens axis 320 is oriented at 45° relative to the beam orientation of beam 315 at the input. If one utilizes A to represent the lens axis angle relative to the beam orientation at the input, then a resulting beam rotation angle B may be calculated as $B=2 \times A$.

The exemplary beam rotator 300 depicted in FIG. 3A is monolithic in design; that is, the cylindrical lenses 305, 310 are formed in or on a single optical component (which may itself include, consist essentially of, or consist of an optically transparent material such as glass or fused silica). In other embodiments, the beam rotator 300 may also be formed using, and may therefore include, consist essentially of, or consist of two distinct and separate cylindrical lenses that are positioned substantially in parallel and confocally. In various embodiments, the focal lengths of the lenses 305, 310 are substantially equal to each other. In embodiments in which the focal lengths of lenses 305, 310 are unequal, the beam rotator 300 will also function as a beam expander (or beam contractor, depending on the orientation of beam rotator 300 relative to the input beam), and not only will the orientation of the output beam be altered, but also the size of the beam will be increased or decreased by beam rotator 300, as understood by those of skill in the art.

FIG. 3B depicts another exemplary beam rotator in accordance with embodiments of the invention, a Dove prism 330. As shown in FIG. 3B, the beam rotator 330 rotates the incoming beam 315 by 90° when the Dove prism is oriented at an angle of $A=45°$ relative to the beam orientation at the input. As detailed above with respect to FIG. 3A, the beam rotation angle B may be calculated by $B=2 \times A$.

Figure 4A:
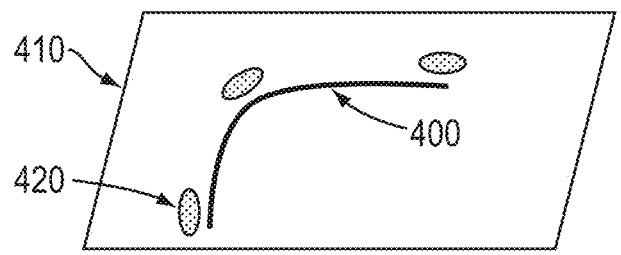
FIGS. 4A-4C schematically depict exemplary processing techniques utilizing rotatable asymmetric laser beam spots in accordance with various embodiments of the present invention.
Figure 4B:
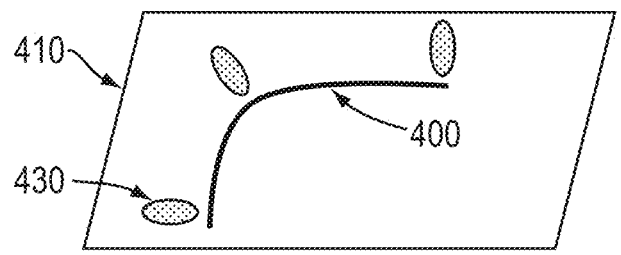
Figure 4C:
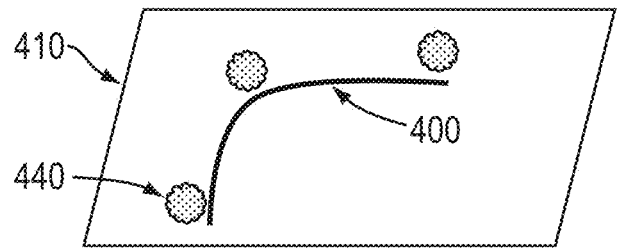

FIGS. 4A-4C schematically depict exemplary processing techniques in accordance with embodiments of the present invention. As detailed here, embodiments of the invention form output beams that are asymmetric and whose orientation may be controlled during processing in response to, for example, processing path direction and/or workpiece characteristics. FIGS. 4A and 4B depict examples in which the rotation of the asymmetric beam spot is synchronized with the processing (e.g., cutting) direction along a processing path 400 on a workpiece 410. In FIG. 4A, a focal spot 420 (e.g., the long axis thereof) of the output laser beam is oriented to be substantially parallel to the processing path 400, even when the direction thereof changes. In various embodiments, such a beam orientation may result in a narrower cut and be suitable for the cutting of thin metals. (While FIG. 4A depicts the long axis of focal spot 420 as parallel to the processing path 400, in other embodiments, the focal spot 420 may have other fixed orientations with respect to the processing path 400. For example, the short axis of the focal spot 420 may be substantially parallel to the processing path 400, or an axis of the focal spot 420 may have some other fixed orientation (e.g., 45°, 90°, etc.) with respect to the processing path 400, which may be maintained even with directional changes in the processing path 400.) In another embodiment, a focal spot 430 shown in FIG. 4B is oriented such that its long axis is substantially perpendicular to the processing path 400. This beam orientation may result in a wider cut, which may be desirable when cutting thicker metals because the wider cut helps to remove (i.e., "blow out") molten material from the cut.

FIG. 4C illustrates yet another example, where a focal spot 440 is circular due to constant physical rotation of the beam rotator in the laser head. In various embodiments, the beam rotator is rotated at a sufficient speed such that, at any given point along the processing path 400, the workpiece 410 experiences the full circularity of the rotated beam. As understood by those of skill in the art, a faster translational speed of the focal spot across the workpiece 410 will require a faster rotational velocity of the beam rotator, while the beam rotator may be rotated more slowly at slower beam translation speeds.

The rotational velocity of the beam rotator (and thus the rotation speed of the laser beam) for a particular processing application may be determined by one of skill in the art without undue experimentation. In various embodiments, the optimal rotation speed may be dependent on laser power, material type and thickness, and ultimately the processing (e.g., cutting) speed. Taking a 100 µm-fiber-delivered 2 kW laser system with 2.5× spot size expansion as an example, such a system will generate a round spot of about 250 µm on a workpiece and will cut 10 mm thick mild steel or 5 mm stainless steel at a speed of about 1 m/min or 16 mm/sec. Assuming at least a full rotation of the laser beam is needed within beam movement of a full spot size (250 µm) to mimic the performance of a round spot, then the minimum beam rotation speed will be about 64 turns per second in this example. Since the laser beam rotates two times faster than the physical rotation of beam rotator and also because there is no difference for a laser beam oriented at an angle A or at an angle A+180°, the minimum rotation speed of the beam rotator for this example will be 16 turns/sec or 960 RPM.

In various embodiments, the rotational control of beam shape or orientation may be combined with control of beam polarization along the processing path, as detailed in U.S. patent application Ser. No. 14/639,401, filed on Mar. 5, 2015, and U.S. patent application Ser. No. 15/649,841, filed on Jul. 14, 2017, the entire disclosure of each of which is incorporated herein by reference.

FIGS. 5A-5C schematically depict exemplary integrated laser systems in which a laser-source module (e.g., a laser resonator) is integrated with a laser head without the use of an optical delivery fiber. That is, in accordance with embodiments of the present invention, no optical fiber may be present within the laser system, at least not between the laser resonator and the laser head. In the depicted examples, a laser module 505 is integrated with and coupled to a laser head 510 that outputs an output beam via a laser head nozzle 515. In various embodiments, the laser head nozzle 515 includes, consists essentially of, or consists of an aperture for directing the laser beam and for protection of upstream components such as optical elements. In various embodiments, the laser head nozzle 515 may also direct compressed gas toward the workpiece to prevent dust, particles of the workpiece, smoke, etc., from entering or contaminating the laser system.

In various embodiments of the invention, the laser head 510 incorporates a physically rotatable and controllable beam rotator for control of orientation of an asymmetric input beam as detailed herein. However, integrated laser systems in accordance with embodiments of the invention are not limited to such examples; in various embodiments, the integrated laser system provides a compact, inexpensive laser source for laser processing, even without orientation control of asymmetric beams. Such systems may even be utilized with symmetric input beams.

FIG. 5A depicts a laser system 500 in which the laser module 505 is fixed on a horizontal rail 520 and outputs a free-space laser beam 525. The beam 525 is redirected by a reflector 530 to the laser head 510, which is mounted on a vertical rail 535. As indicated by arrows 540, 545, the laser head 510 may be moved vertically and horizontally along the rails 520, 535 during processing to control the placement and/or spot size of the output beam emitted by nozzle 515. In various embodiments, the rails 520, 535 themselves are stationary over the workpiece during processing thereof. While FIG. 5A depicts the angle traversed by the beam 525 from horizontal rail 520 to the vertical rail 535 (via the reflector 530) as approximately 90°, in other embodiments this angle is less than 90° (e.g., ranging from approximately 15° to approximately 85°, ranging from approximately 45° to approximately 85°, or ranging from approximately 15° to approximately 45°) or greater than 90°. In various embodiments, multiple reflectors 530 are utilized along the beam path from the laser module 505 to the laser head 510. FIG. 5B depicts a laser system 501 in which the reflector 530 is omitted.

Rather, the laser module 505 is itself mounted on the vertical rail 535 and is translated along with the laser head 510 during movement thereof, as indicated by arrow 550. The laser head 510 itself may be moved vertically relative to the laser module 505, as indicated by arrow 555.

FIG. 5C depicts a laser system 502 in which the laser module 505 is directly coupled to the laser head 510 using an adaptor (or "coupler") 560. In the depicted embodiment, the laser module 505 is translated with the laser head 510 during both horizontal and vertical motion thereof, as indicated by arrows 565, 570. In various embodiments, the adaptor 560 may include, consist essentially of, or consist of hardware and/or joints that mechanically connect the laser head 510 to the laser module 505, e.g., nails, screws, welds, brazes, a collar attached to both components, etc., while transmitting the laser beam from the laser module 505 to the laser head 510. In various embodiments, the adaptor 560 may include a transparent window for transmission of the beam to the laser head 510 while providing additional protection to the laser module 505. In various embodiments, in order to reduce the risk of damaging the laser module 505 in the event of laser head 510 coming into contact with the workpiece or another obstacle, the adaptor 560 may include, consist essentially of, or consist of a shock-absorbing mechanism such as one or more elastic o-rings, gaskets, and/or springs. In such embodiments, the adaptor 560 may absorb part of all of the mechanical force applied to laser head 510 without such force being transmitted to the laser module 505. As shown in FIG. 5C, laser system 502 may be considered to be a single-package, or unified, laser system, i.e., a laser module having a built-in laser head (including, e.g., optics for focusing and/or manipulating the processing beam), or a processing or laser head having a built-in laser source module. As such, laser system 502 may be advantageously compact and require fewer components than other laser-processing systems.

While FIGS. 5A-5C depict embodiments enabling movement of at least the laser head 510 in a single plane (i.e., the plane defined by rails 520, 535), embodiments of the invention may also enable three-dimensional movement of at least the laser head 510. For example, embodiments of the invention may enable movement of at least the laser head 510 (and, in some embodiments, the laser module 505) in the plane into and out of the plane of FIGS. 5A-5C via, e.g., one or more additional rails positioned perpendicular to rails 520, 535.

In various embodiments, the laser head 510 may include one or more optical elements (e.g., lenses) and a lens manipulation system for selection and/or positioning thereof for, e.g., alteration of beam shape and/or BPP of the output beam, as detailed in U.S. patent application Ser. No. 15/188,076, filed on Jun. 21, 2016, the entire disclosure of which is incorporated by reference herein.

As detailed above, the computer-based controller may control the movement of the laser head 510 (and, in various embodiments, the laser module 505) during processing (e.g., along one or both rails 520, 535), as well as the physical rotation of the beam rotator, if present. In various embodiments, the controllable beam rotator need not be positioned within the laser head 510 itself. Rather, in various embodiments, the beam rotator may be disposed within the laser module 505 itself or at any location along the beam path between the laser module 505 and the laser head 510. For example, in the laser system 502 depicted in FIG. 5C, the beam rotator may be disposed within the adaptor 560, which may be freely and independently rotatable to rotate the beam rotator.

Figure 6:
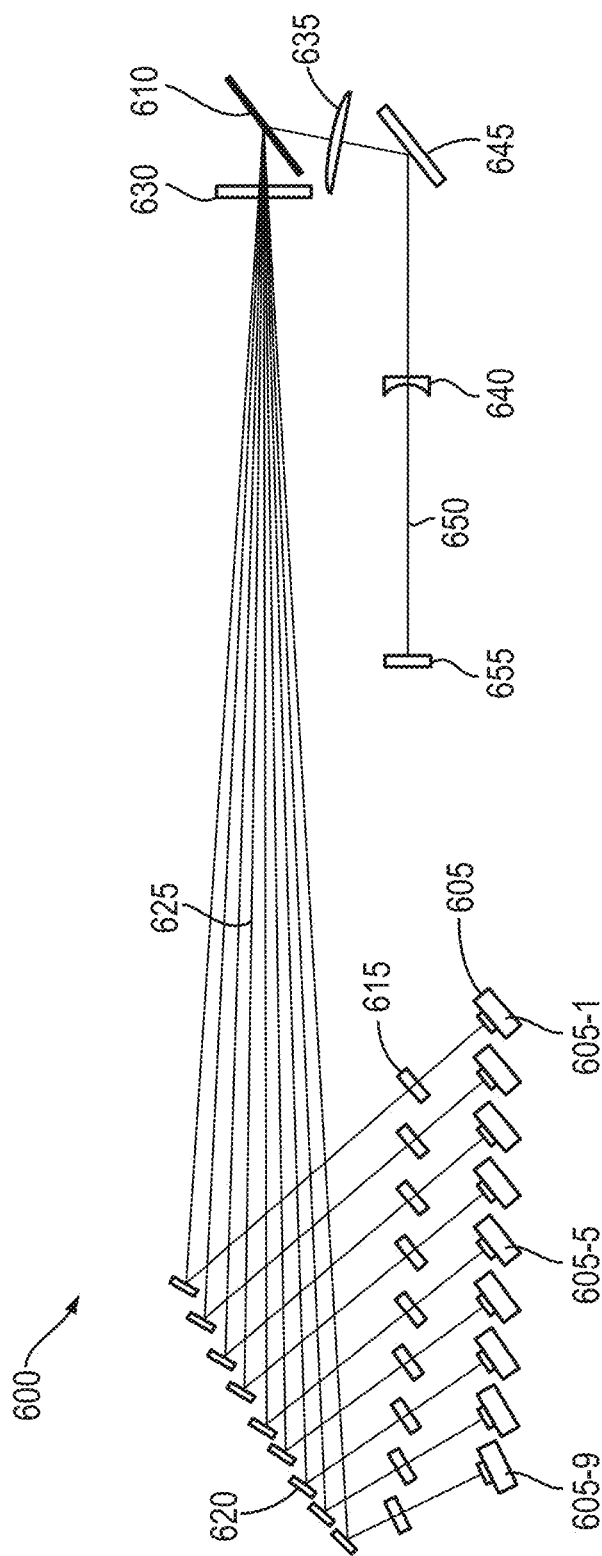
FIG. 6 is a schematic diagram of a laser resonator in accordance with various embodiments of the present invention.

The present disclosure utilizes WBC resonators as examples of laser modules (i.e., laser sources) usable in accordance with embodiments of the present invention. While exemplary embodiments include WBC resonators, embodiments of the invention may also be utilized with other types of laser resonators utilizing one or more beam emitters and outputting one or more asymmetric or symmetric output beams. FIG. 6 schematically depicts various components of a WBC resonator 600 that may be utilized in embodiments of the present invention. In the depicted embodiment, resonator 600 combines the beams emitted by nine different diode bars (as utilized herein, "diode bar" refers to any multi-beam emitter, i.e., an emitter from which multiple beams are emitted from a single package). Embodiments of the invention may be utilized with fewer or more than nine emitters. In accordance with embodiments of the invention, each emitter may emit a single beam, or, each of the emitters may emit multiple beams. The view of FIG. 6 is along the WBC dimension, i.e., the dimension in which the beams from the bars are combined. The exemplary resonator 600 features nine diode bars 605, and each diode bar 605 includes, consists essentially of, or consists of an array (e.g., one-dimensional array) of emitters along the WBC dimension. In various embodiments, each emitter of a diode bar 605 emits an asymmetric beam having a larger divergence in one direction (known as the "fast axis," here oriented vertically relative to the WBC dimension) and a smaller divergence in the perpendicular direction (known as the "slow axis," here along the WBC dimension). Accordingly, the WBC resonator 600 outputs an asymmetric output beam that may be controlled downstream as detailed herein.

In various embodiments, each of the diode bars 605 is associated with (e.g., attached or otherwise optically coupled to) a fast-axis collimator (FAC)/optical twister microlens assembly that collimates the fast axis of the emitted beams while rotating the fast and slow axes of the beams by 90°, such that the slow axis of each emitted beam is perpendicular to the WBC dimension downstream of the microlens assembly. The microlens assembly also converges the chief rays of the emitters from each diode bar 605 toward a dispersive element 610. Suitable microlens assemblies are described in U.S. Pat. No. 8,553,327, filed on Mar. 7, 2011, and U.S. Pat. No. 9,746,679, filed on Jun. 8, 2015, the entire disclosure of each of which is hereby incorporated by reference herein.

In embodiments of the invention in which both a FAC lens and an optical twister (e.g., as a microlens assembly) are associated with each of the beam emitters and/or emitted beams, and SAC lenses (as detailed below) affect the beams in the non-WBC dimension. In other embodiments, the emitted beams are not rotated, and FAC lenses may be utilized to alter pointing angles in the non-WBC dimension. Thus, it is understood that references to SAC lenses herein generally refer to lenses having power in the non-WBC dimension, and such lenses may include FAC lenses in various embodiments. Thus, in various embodiments, for example embodiments in which emitted beams are not optically rotated within the resonator and/or the fast axes of the beams are in the non-WBC dimension, FAC lenses may be utilized as detailed herein for SAC lenses.

As shown in FIG. 6, resonator 600 also features a set of SAC lenses 615, one SAC lens 615 associated with, and receiving beams from, one of the diode bars 605. Each of the SAC lenses 615 collimates the slow axes of the beams emitted from a single diode bar 605. After collimation in the slow axis by the SAC lenses 615, the beams propagate to a set of interleaving mirrors 620, which redirect the beams 625 toward the dispersive element 610. The arrangement of the interleaving mirrors 620 enables the free space between the diode bars 605 to be reduced or minimized. Upstream of the dispersive element 610 (which may include, consist essentially of, or consist of, for example, a diffraction grating such as the transmissive diffraction grating depicted in FIG. 6, or a reflective diffraction grating), a lens 630 may optionally be utilized to collimate the sub-beams (i.e., emitted rays other than the chief rays) from the diode bars 605. In various embodiments, the lens 630 is disposed at an optical distance away from the diode bars 605 that is substantially equal to the focal length of the lens 630. Note that, in typical embodiments, the overlap of the chief rays at the dispersive element 610 is primarily due to the redirection of the interleaving mirrors 620, rather than the focusing power of the lens 630.

Also depicted in FIG. 6 are lenses 635, 640, which form an optical telescope for mitigation of optical cross-talk, as disclosed in U.S. Pat. No. 9,256,073, filed on Mar. 15, 2013, and U.S. Pat. No. 9,268,142, filed on Jun. 23, 2015, the entire disclosure of which is hereby incorporated by reference herein. Resonator 600 may also include one or more optional folding mirrors 645 for redirection of the beams such that the resonator 600 may fit within a smaller physical footprint. The dispersive element 610 combines the beams from the diode bars 605 into a single, multi-wavelength beam 650, which propagates to a partially reflective output coupler 655. The coupler 655 transmits a portion of the beam as the output beam of resonator 600 while reflecting another portion of the beam back to the dispersive element 610 and thence to the diode bars 605 as feedback to stabilize the emission wavelengths of each of the beams.

Figure 7A:
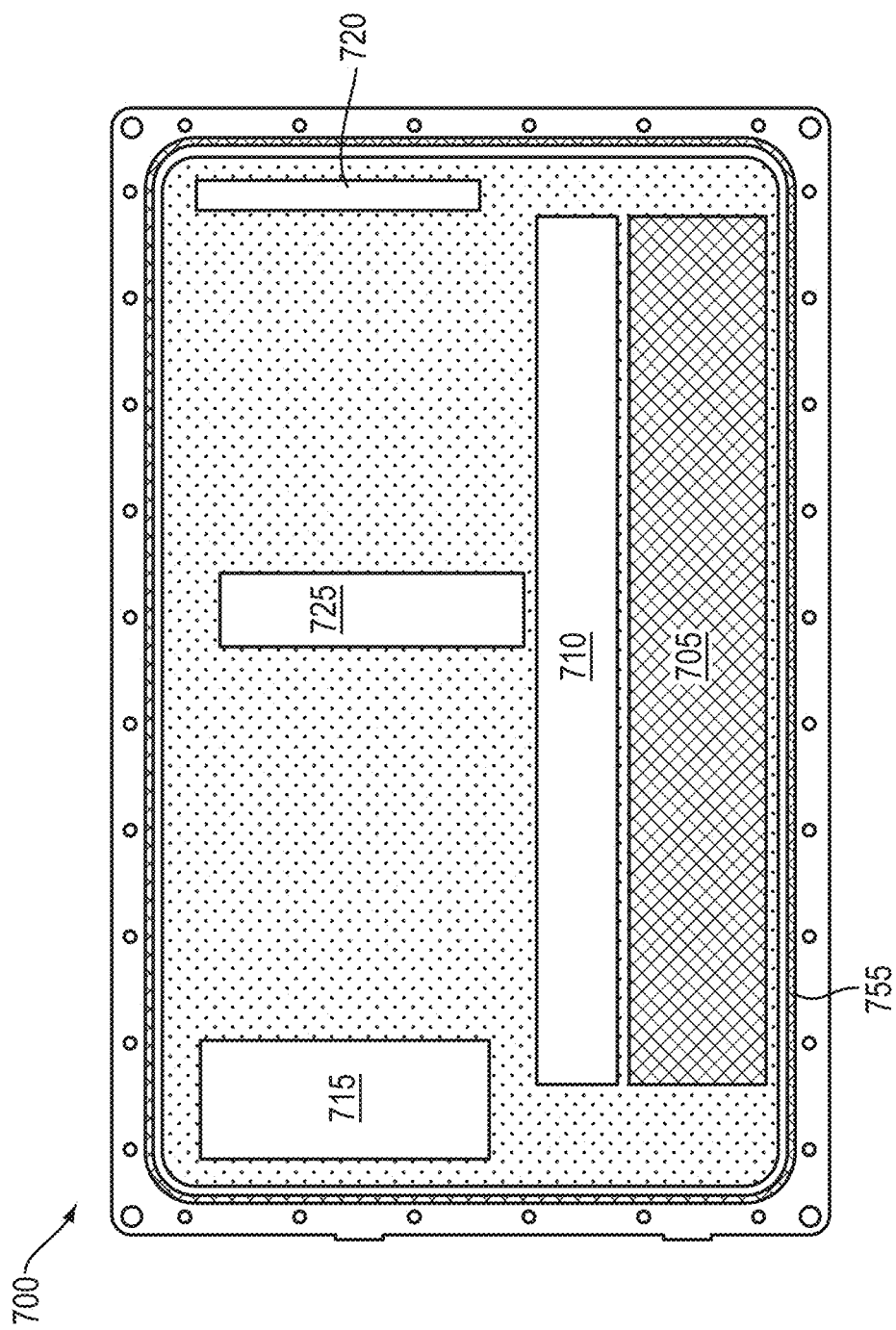
FIG. 7A is a schematic view of a first side of a laser resonator in accordance with various embodiments of the present invention.
Figure 7B:
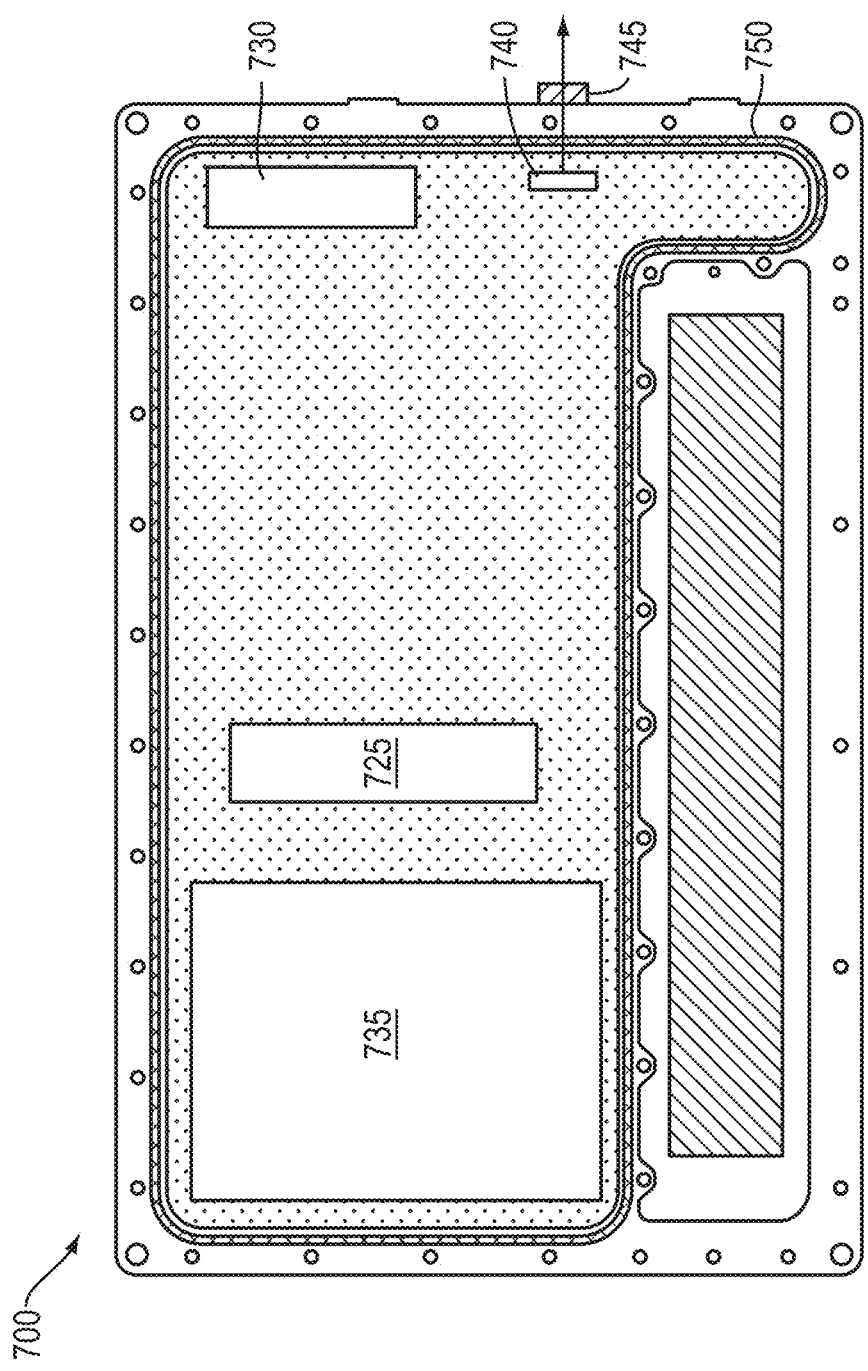
FIG. 7B is a schematic view of a second side of a laser resonator in accordance with various embodiments of the present invention.

Various embodiments of the invention include laser resonators with external lasing cavities, as described in accordance with FIG. 6, and reduce the required size of the resonator by utilizing opposing sides of the resonator to form a larger optical cavity. Reflectors such as mirrors may be utilized to direct the beams within the optical cavity, and, since the optical cavity extends along both sides of the resonator, the overall size of the resonator may be correspondingly reduced for the same cavity size (e.g., compared to a resonator having an optical cavity on only one side). For example, FIGS. 7A and 7B are simplified schematic diagrams of opposite sides of a laser resonator 700 in which areas for various components of the resonator 700 may be mounted on a rigid base plate. In the exemplary resonator 700, beams from beam emitters mounted in a mounting area 705 may be focused by a group of lenses (and/or other optical elements; e.g., SAC lenses 615) disposed in a lens area 710 toward a group of mirrors (e.g., interleaving mirrors 620) in a mirror area 715. From mirror area 715, the beams from the beam emitters may be directed to another mirror area 720 (containing multiple reflectors such as mirrors, e.g., folding mirrors) and thence through an opening 725 to the opposite side of resonator 700 depicted in FIG. 7B. In FIG. 7B, the beams may be directed to a mirror area 730 (containing multiple reflectors such as mirrors, e.g., folding mirrors), which reflects the beams to a beam-combining area 735. In example embodiments, the beam-combining area 735 may include therewithin a diffusive element such as a diffraction grating (and, in some embodiments, an output coupler), as described in relation to FIG. 6. In various embodiments, the beams each have a different wavelength, and the beams are combined in beam-combining area 735 into an output beam composed of the multiple wavelengths. The beam from the beam-combining area 735 may be directed to a mirror 740 (which, in various embodiments, may be the partially reflective output coupler described in relation to FIG. 6) and thence to an output 745 for emission from the resonator 700. For example, the output 745 may be a window for emission of the beam therethrough or an optical coupler configured to connect to a laser head as detailed herein (for example, as shown in FIGS. 5A-5C).

FIGS. 7A and 7B also depict sealing paths 750, 755. In various embodiments, cover plates may be mounted over one or both sides of the resonator 700 in order to cover and protect the internal cavities and the components therewithin. For example, the cover plates may be sealed to the resonator 700 via o-rings or other seals, and the cover plates may be attached to the resonator with one or more fasteners (screws, bolts, rivets, etc.) or an adhesive material, and/or via a technique such as welding or brazing.

Therefore, in accordance with embodiments of the invention, a laser source such as resonator 700 is optically coupled to a laser head, which may contain or be associated with a controllable beam rotator, without the use of an optical delivery fiber therebetween. For example, the laser head may be directly coupled to the output 745—the output 745 may be coupled to or be a portion of the adaptor 560 shown in FIG. 5C. In other examples, the beam may be output from output 745 and transmitted in free space to the laser head, as shown in FIGS. 5A and 5B.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

The invention claimed is:

1. A laser system for directing a laser beam to a workpiece to be processed, the laser system comprising:
   a laser resonator comprising (i) a resonator housing, (ii) a plurality of beam emitters, each configured to emit one or more beams, disposed within the resonator housing, (iii) disposed within the resonator housing, a plurality of optical components for manipulating the beams from the beam emitters to form an output beam, and (iv) a resonator output for transmitting the output beam from the resonator housing; and
   a laser head positioned to receive the output beam from the laser resonator, the laser head comprising (i) a beam rotator configured to (a) receive the output beam and optically rotate the output beam by a rotation angle, and (b) be physically rotatable about an axis parallel to a propagation direction of the output beam, and (ii) focusing optics for focusing the output beam toward the workpiece.

2. The laser system of claim 1, wherein the output beam does not propagate within an optical fiber between the laser resonator and the laser head.

3. The laser system of claim 1, wherein the laser head is directly coupled to the laser resonator with an adaptor therebetween.

4. The laser system of claim 1, wherein the laser head is spaced away from the laser resonator, whereby the output beam propagates in free space therebetween.

5. The laser system of claim 1, further comprising a first rail to which the laser head is mechanically coupled, whereby the laser head is configured for vertical translation along the first rail over the workpiece.

6. The laser system of claim 5, wherein the laser resonator is mechanically coupled to the first rail.

7. The laser system of claim 5, wherein the laser resonator is configured for vertical translation along the first rail during vertical translation of the laser head along the first rail.

8. The laser system of claim 5, wherein the laser resonator is configured to remain stationary on the first rail during vertical translation of the laser head along the first rail.

9. The laser system of claim 5, further comprising a second rail, angled with respect to the first rail, whereby the laser head is configured for horizontal translation over the workpiece via the second rail.

10. The laser system of claim 9, wherein the laser resonator is mechanically coupled to the second rail.

11. The laser system of claim 10, wherein the laser resonator is configured to remain stationary on the second rail during translation of the laser head via the second rail.

12. The laser system of claim 10, further comprising a reflector for receiving the output beam from the laser resonator and redirecting the output beam to the laser head.

13. The laser system of claim 1, wherein the output beam is asymmetric in beam quality and/or beam shape.

14. The laser system of claim 1, wherein:
   the laser resonator comprises, disposed within the resonator housing, a resonator baseplate having opposing first and second sides and defining an opening therethrough extending from the first to the second side,
   the plurality of beam emitters are disposed on the first side of the resonator baseplate,
   the plurality of optical components comprises, disposed on the second side of the resonator baseplate, (i) a dispersive element for combining the beams emitted by the beam emitters into a multi-wavelength beam, and (ii) a partially reflective output coupler for receiving the multi-wavelength beam from the dispersive element, transmitting a first portion of the multi-wavelength beam as the output beam, and reflecting a second portion of the multi-wavelength beam back toward the dispersive element.

15. The laser system of claim 14, wherein the plurality of optical components comprises, disposed on the first side of the resonator baseplate:

a plurality of slow-axis collimation lenses disposed optically downstream of the plurality of beam emitters, each slow-axis collimation lens configured to receive one or more beams from one of the beam emitters; and a plurality of folding mirrors disposed optically downstream of the slow-axis collimation lenses and positioned to receive beams therefrom and reflect the beams through the opening.

16. The laser system of claim 14, wherein the resonator output is spaced away from the partially reflective output coupler and positioned to receive the output beam therefrom.

17. The laser system of claim 14, wherein the resonator output comprises the partially reflective output coupler.

18. The laser system of claim 17, wherein the laser head is directly coupled to the beam output.

19. The laser system of claim 17, further comprising an adaptor mechanically coupling the laser head to the laser resonator at the beam output.

20. The laser system of claim 17, wherein the laser head is spaced away from the beam output, whereby the output beam propagates through free space therebetween.

21. The laser system of claim 1, further comprising a controller for controlling physical rotation of the beam rotator, the beam rotator being responsive to the controller.

22. The laser system of claim 21, wherein the controller is configured to constantly physically rotate the beam rotator as the output beam is translated along a processing path on the workpiece.

23. The laser system of claim 22, wherein the output beam is asymmetric in beam shape, and the controller is configured to physically rotate the beam rotator at a rate sufficient to maintain a circular laser spot on the workpiece as the output beam is translated along a processing path on the workpiece.

* * * * *